United States Patent
Friederich et al.

(10) Patent No.: US 7,628,367 B2
(45) Date of Patent: Dec. 8, 2009

(54) MOUNT INTERFACE FOR SUSPENDED CEILING

(75) Inventors: Steven E. Friederich, Bloomington, MN (US); Steven E. Durkee, Chanhassen, MN (US); Derek L. Derks, Chanhassen, MN (US)

(73) Assignee: Milestone AV Technologies, LLC, Savage, MN (US)

( * ) Notice: Subject to any disclaimer, the term of this patent is extended or adjusted under 35 U.S.C. 154(b) by 0 days.

(21) Appl. No.: 11/744,755

(22) Filed: May 4, 2007

(65) Prior Publication Data

US 2007/0272816 A1 Nov. 29, 2007

Related U.S. Application Data

(60) Provisional application No. 60/798,085, filed on May 5, 2006.

(51) Int. Cl.
*B42F 13/00* (2006.01)
(52) U.S. Cl. ...................................... 248/343
(58) Field of Classification Search .............. 248/343, 248/342, 344, 317, 349.1, 282.1; 52/65; 40/617
See application file for complete search history.

(56) References Cited

U.S. PATENT DOCUMENTS

| | | | |
|---|---|---|---|
| 3,710,520 A | 1/1973 | Federowicz | |
| 4,160,999 A | 7/1979 | Claggett | |
| 4,361,992 A | 12/1982 | Rapp | |
| 4,441,282 A | 4/1984 | Thual | |
| 4,546,708 A * | 10/1985 | Wilburth | 108/94 |
| 4,750,832 A | 6/1988 | Lloyd, Sr. et al. | |
| 4,764,008 A | 8/1988 | Wren | |
| 5,088,574 A | 2/1992 | Kertesz, III | |
| 6,095,468 A * | 8/2000 | Chirico et al. | 248/282.1 |
| 6,467,209 B1 | 10/2002 | Vickers | |
| 6,478,272 B1 * | 11/2002 | McKinsey et al. | 248/216.1 |
| 6,695,270 B1 * | 2/2004 | Smed | 248/274.1 |
| 7,004,437 B2 * | 2/2006 | Bauer et al. | 248/282.1 |
| 7,269,927 B2 | 9/2007 | Savard | |

OTHER PUBLICATIONS

Chief, Ideas Supporting Ideas, Full-Line Product Guide 2004, Effective Jan. 2004, p. 19.

* cited by examiner

*Primary Examiner*—Ramon O Ramirez
(74) *Attorney, Agent, or Firm*—Patterson, Thuente, Skaar & Christensen, PA

(57) ABSTRACT

A mounting system for coupling an electronic display device to a fixed structure includes a support structure mountable to the fixed structure and a rotating assembly. When the fixed structure is a suspended ceiling, the support structure may replace a suspended ceiling tile, fit into a suspended ceiling tile, or may be affixed to the ceiling structure above the suspended ceiling tile. The rotating assembly may include a first turntable, a second turntable, and a structure for receiving a mounting column. The first turntable rotates with respect to the support structure about a rotational axis, and the second turntable is rotatable with respect to the first turntable about a second rotational axis. The first rotational axis and the second rotational axis may or may not be offset from each other. The mounting column is positioned on the second turntable.

17 Claims, 7 Drawing Sheets

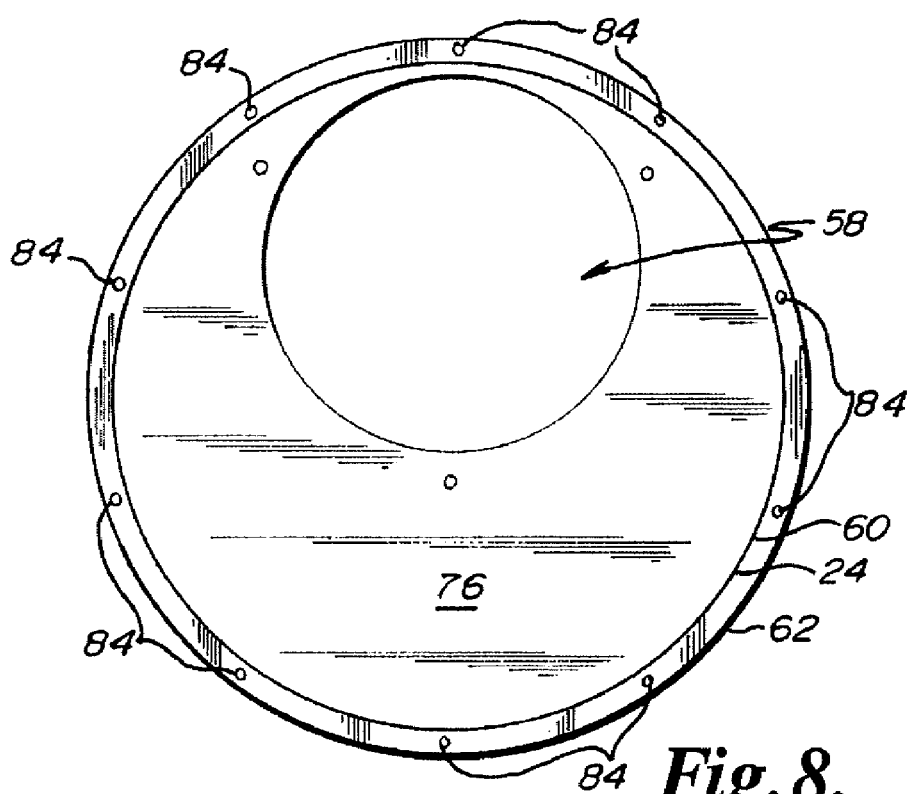
Fig. 8.
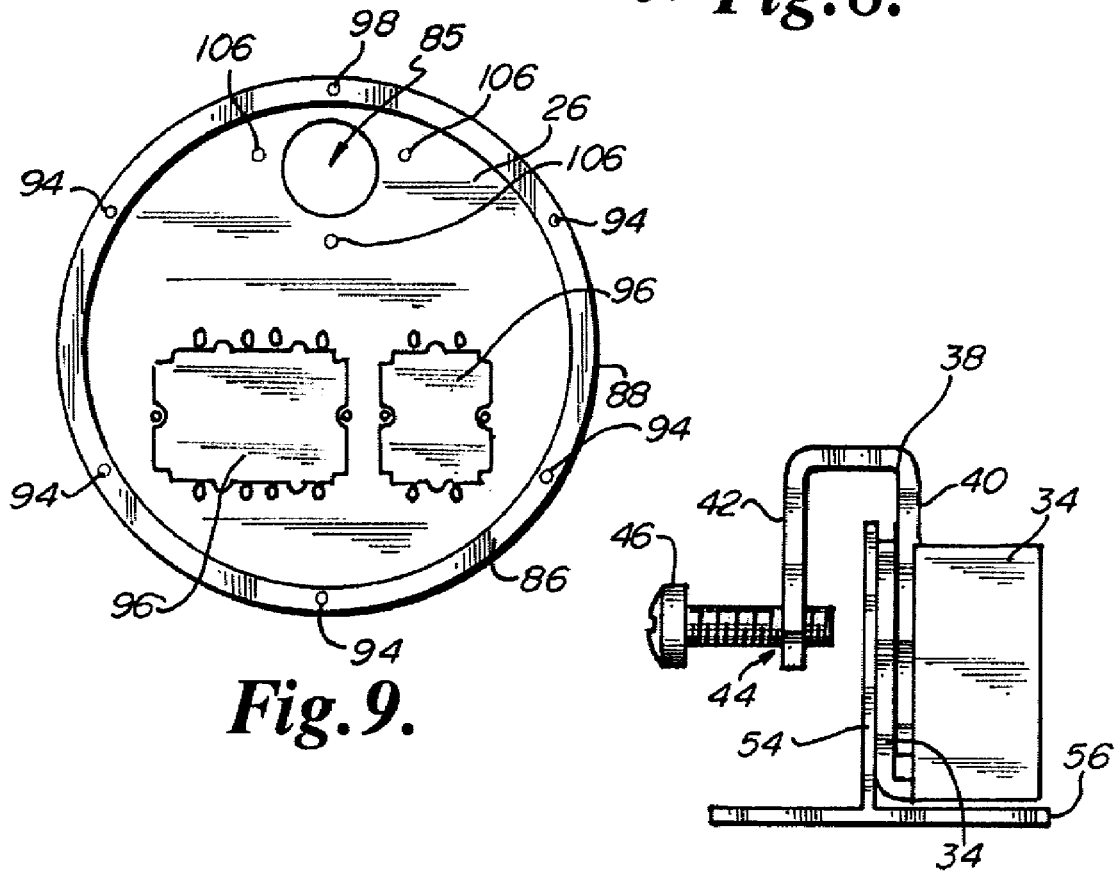
Fig. 9.
Fig. 10.

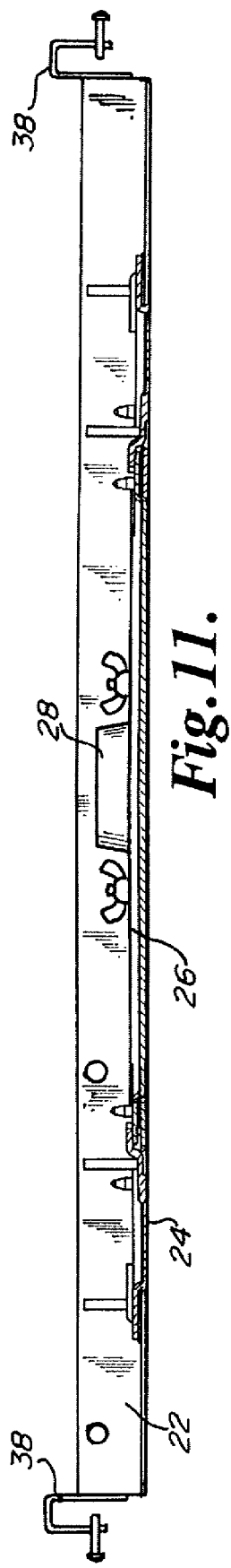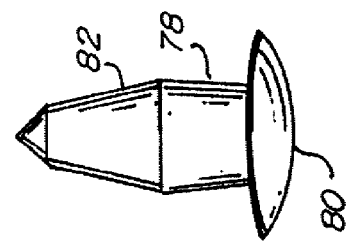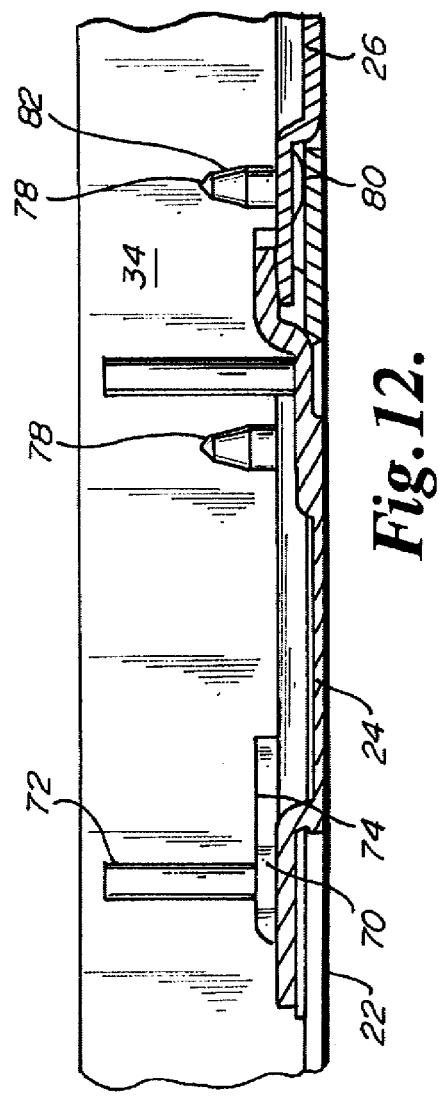

MOUNT INTERFACE FOR SUSPENDED CEILING

RELATED APPLICATION

The present application claims the benefit of U.S. Provisional Application No. 60/798,085 filed May 5, 2006, which is incorporated herein in its entirety by reference.

FIELD OF THE INVENTION

The present invention relates to mounting devices, and more specifically to ceiling mounts for projectors and other electrical devices.

BACKGROUND OF THE INVENTION

Multi-media presentations performed with video projection equipment have become very common for business and entertainment purposes. Often, the video projection equipment is a portable LCD projector that is placed on a table, cart, or stand in the room, with the image projected on a portion of the wall or a portable screen. Such impromptu arrangements, however, have a number of drawbacks. First, a considerable amount of time is often needed to position, aim, and focus the projector in advance of the presentation—time that is expended repeatedly whenever a different projector is set up. Further, it is often difficult to position a portable projector where it is not in the way of persons moving about in the room, or in the line of sight for those viewing the presentation. Moreover, the wires and cables used to connect the projector with the computer are in the open at ground level, presenting a tripping hazard and an opportunity for damage to the projector if someone comes in contact with the wires and cables.

In view of these many drawbacks of portable projectors, mounting devices have been developed to enable mounting of a projection device from the ceiling of a presentation room. Such devices have generally been successful in alleviating some of the problems associated with a projector at ground level having exposed wires.

A challenge associated with ceiling mounts, however, is in how to attach the mount to the ceiling. Suspended ceilings, consisting of a framework suspended from a floor or roof assembly and holding a multiplicity of tiles, is a very common finished ceiling arrangement in commercial construction. The ceiling tiles themselves are typically made from fibrous material and do not have sufficient structural strength to support the dead load of a heavy projector or other device coupled with a mount. Further, it is required in many regions that the mount and interface withstand seismic loads of a specified magnitude. Standard ceiling tiles are unable to meet these seismic load requirements while supporting a device and associated mount.

For these reasons, mounts are often attached directly to the deck or structural frame of the roof or floor assembly above. A drawback of direct attachment, however, is that device location within the room is then limited to locations where structure, such as a bar joist or beam exists to attach the mount. Alternatively, the mount may be permanently attached to the deck. In either case, however, subsequent relocation of the device within the room can be difficult and expensive.

As an alternative to direct attachment, interfaces have been developed to enable attachment of a mount to the suspended ceiling framework. These existing devices typically include a plate that spans adjacent members of the framework. The plate defines a series of apertures that receive fasteners to attach a mount to the plate. The plate is typically concealed above a ceiling tile for aesthetic reasons. A drawback of such devices, however, is that location of the mount on the plate is limited by the finite locations of the apertures. Moreover, the concealing ceiling tile must be cut to fit during installation, requiring skill and increasing the time for installation. Further, such devices typically have no provision for routing the electrical wires and cables associated with the device to be mounted, thus requiring a separate interface to be provided for these.

Another difficulty faced with existing ceiling projector mount solutions is that of aiming and focusing the projector. Customers purchasing high-end built-in video projection systems may expect that the system will produce a projected image that precisely fits the screen and that has very sharp focus. It may be necessary to adjust the position of the projector laterally as well as fore and aft multiple times in order to determine an optimal position. With existing mount systems, however, repositioning the projector multiple times can be laborious, time consuming and costly.

What is needed in the industry is a mount interface for a suspended ceiling that reduces the time and skill needed for installation, and enables simple relocation and positioning of the device within the room and relative to the projection screen

SUMMARY OF THE INVENTION

The instant invention addresses the need of the industry for a mount interface for a suspended ceiling that reduces the time and skill needed for installation, and enables simple relocation and positioning of the device within the room and relative to the projection screen. According to an embodiment of the invention, a suspended ceiling mount interface generally includes an outer frame, an outer turntable rotatably received within an aperture defined in the outer frame, an inner turntable rotatably received within an aperture in the outer turntable, and a column interface flange on the inner turntable and adapted to receive a pipe column operably coupled with the device to be mounted. The outer frame may be dimensioned the same as a standard ceiling tile so as to be receivable directly in the suspended ceiling framework. Alternatively, the outer frame may be dimensioned smaller than a standard ceiling tile, and may be affixed to surrounding tiles or affixed to the suspended ceiling framework. Further, the outer frame may be affixed above the suspended ceiling as compared to being directly receivable in the suspended ceiling. Once in position, the outer and inner turntables may be rotated so as to position the pipe column at any location within a circle defined by rotation of the outer turntable. Knockouts for accessing electrical boxes may be provided on either the inner or outer turntable to enable a simple and aesthetically appealing solution for routing electrical wires to the device to be mounted. Alternatively, the knockouts may be provided in the outer frame.

In another embodiment of the invention, a suspended ceiling mount interface generally includes an outer frame, an outer turntable rotatably received within an aperture defined in the outer frame, an inner turntable rotatably received within an aperture in the outer turntable, and a column interface flange on the inner turntable and adapted to receive a pipe column operably coupled with the device to be mounted. The outer frame may be dimensioned the same as a standard ceiling tile or may be greater or smaller in size. A suspended ceiling mount interface may be positioned above a ceiling tile and secured to the suspended ceiling framework or other structure located above the suspended ceiling. Once in position, the outer and inner turntables may be rotated so as to position the column interface flange, which is adapted to accept the pipe column, at any location within a circle defined by rotation of the outer turntable. Once the column interface flange is positioned where desired, the ceiling tile positioned below the suspended ceiling mount interface may be pierced, forming a cut-out that can accept a pipe column. Knockouts for accessing electrical boxes may be provided on either the inner or outer turntable, or in the outer frame, to enable a solution for managing electrical wires to the device to be mounted.

In an embodiment of the invention, a mounting system for coupling an electronic display device to a fixed structure, such as a ceiling, includes a support structure mountable to the fixed structure and a rotating assembly. When the fixed structure is a suspended ceiling, the support structure may replace a suspended ceiling tile, fit into a suspended ceiling tile, or may be affixed to the ceiling structure above the suspended ceiling tile. The rotating assembly is operably coupled to the support structure. The rotating assembly may include a first turntable, a second turntable, and a structure for receiving a mounting column. The first turntable rotates with respect to the support structure about a rotational axis, and the second turntable is rotatable with respect to the first turntable about a second rotational axis. The first rotational axis and the second rotational axis may or may not be offset from each other. The mounting column is positioned on the second turntable.

In another embodiment of the invention, a ceiling mount for a display device comprises a support structure that is mountable in a ceiling grid of a suspended ceiling. A mounting column interface is coupled to the support structure. The support structure may include an outer frame and a face plate. The ceiling mount interface may include a first means for rotating the mounting column interface with respect to the support structure about a first rotational axis. The ceiling mount interface may also include a second means for rotating the mounting column interface with respect to the first rotating means and support structure about a second rotational axis. The first rotational axis and the second rotational axis may or may not be offset from each other. Further, the mounting column interface may include a column interface flange which is rotatable with respect to the second rotating means, the first rotating means, and the support structure.

BRIEF DESCRIPTION OF THE DRAWINGS

FIG. 8 is a top plan view of the outer turntable portion of the mount interface for suspended ceiling depicted in FIG. 5;

FIG. 9 is a top plan view of the inner turntable portion of the mount interface for suspended ceiling depicted in FIG. 5;

FIG. 10 is a fragmentary side elevation view of the outer frame of a mount interface for suspended ceiling according to an embodiment of the invention depicting the edge wall and clamp confronting a member of a suspended ceiling framework;

FIG. 11 is cross section of the mount interface for suspended ceiling depicted in FIG. 1 taken at section 11-11;

FIG. 12 is a fragmentary view of the cross section of region of FIG. 11 denoted by broken-line and annotated FIG. 12;

FIG. 13 is a perspective view of a bearing button according to an embodiment of the invention;

DETAILED DESCRIPTION OF THE PREFERRED EMBODIMENTS

Figure 1:
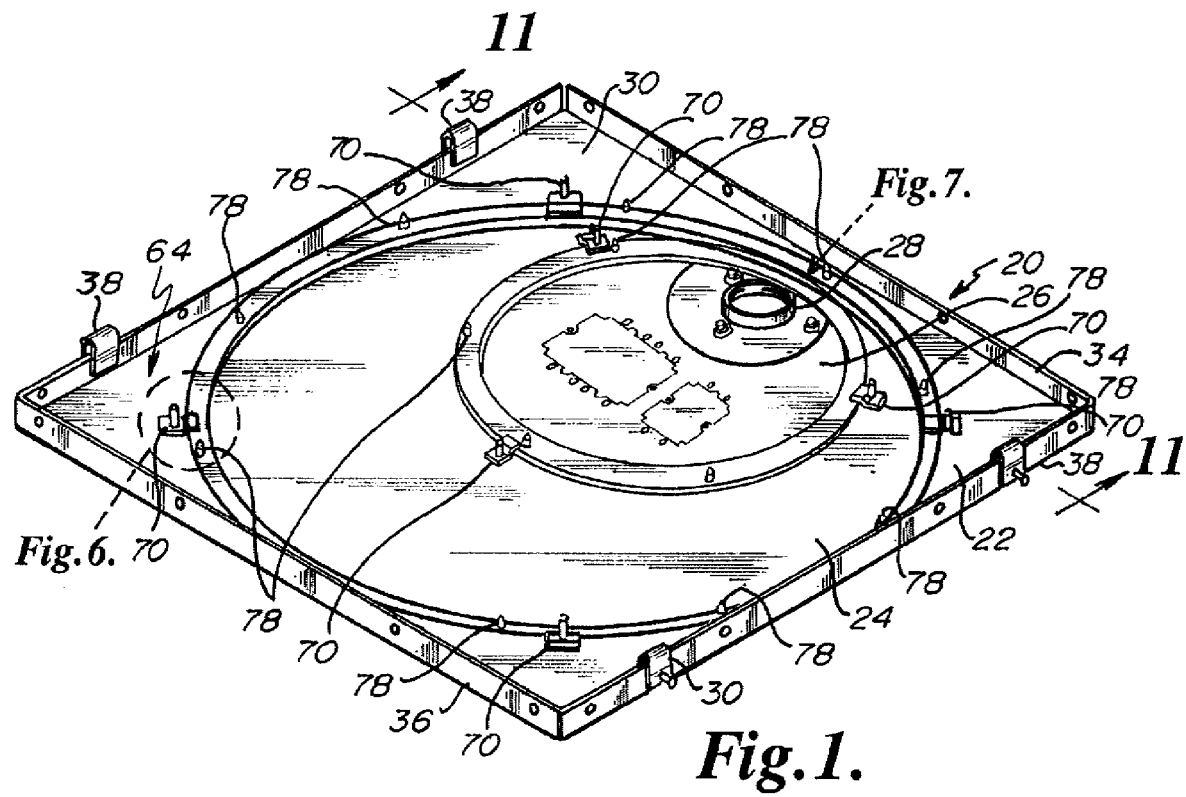
FIG. 1 is a top perspective view of a mount interface for suspended ceiling according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

Suspended ceiling mount interface 20 generally includes outer frame 22, outer turntable 24, inner turntable 26, and column interface flange 28. Outer frame 22 has face portion 30 defining aperture 32 for receiving outer turntable 24. Wall 34 extends upwardly at perimeter 36. Clamps 38 are spaced apart along wall 34. As depicted in FIG. 10, each clamp 38 is generally U-shaped and includes inner portion 40 which attaches to wall 34, and outer portion 42 which defines an aperture 44 for receiving threaded fastener 46.

Figure 2:
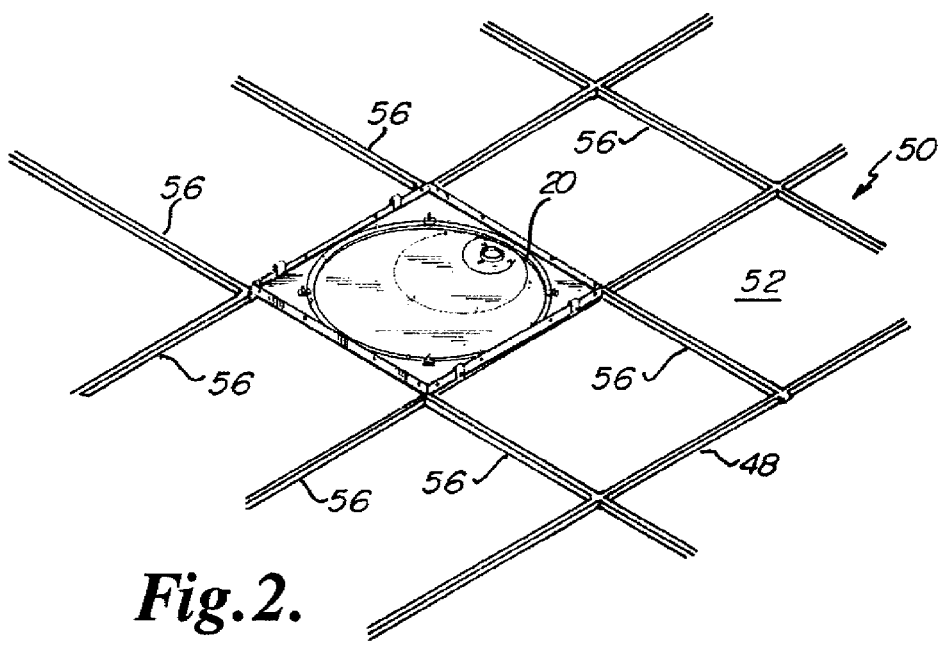
FIG. 2 is a perspective view of the mount interface for suspended ceiling of FIG. 1 in place in a suspended ceiling framework.
Figure 3:
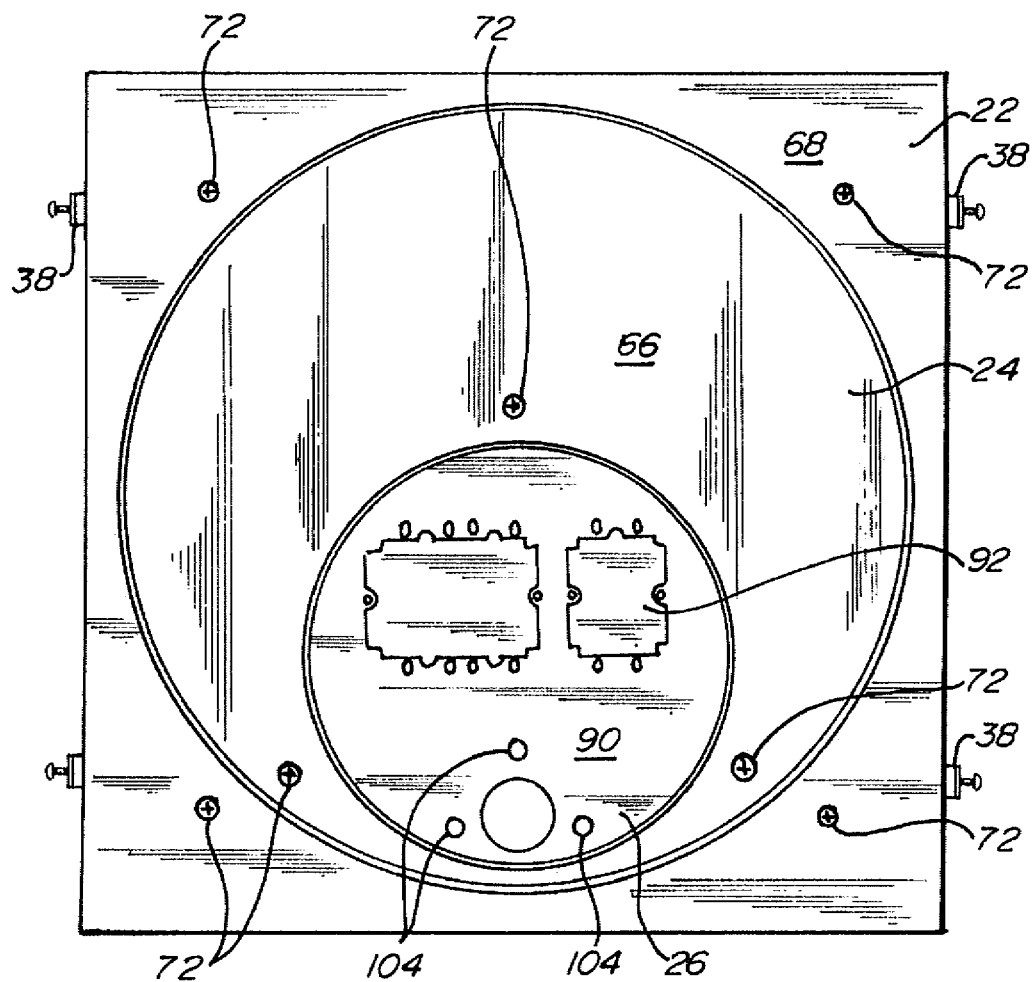
FIG. 3 is a bottom plan view of a mount interface for suspended ceiling according to an embodiment of the invention.
Figure 4:
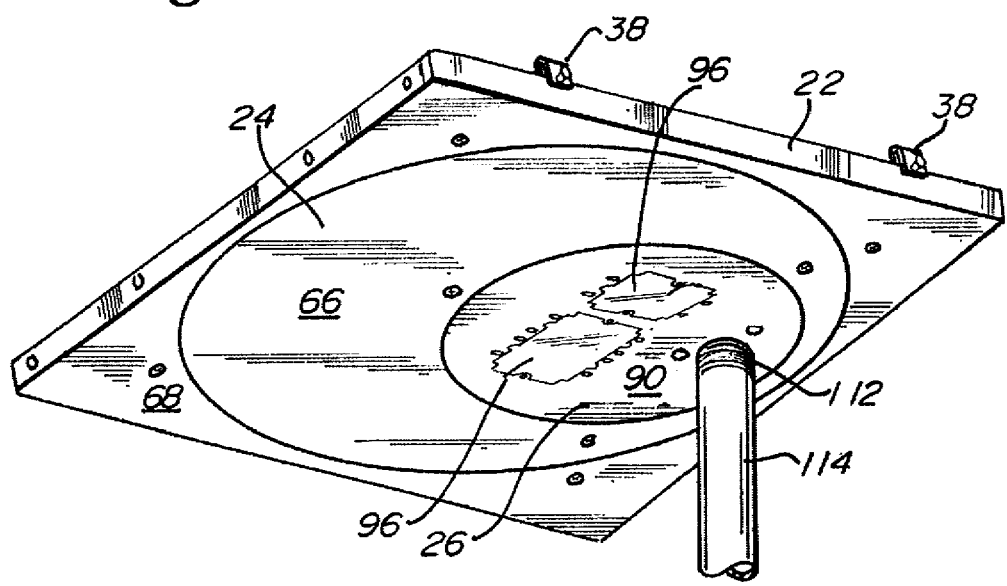
FIG. 4 is a bottom perspective view of a mount interface for suspended ceiling according to an embodiment of the invention with a pipe column received in the column interface flange.

Outer frame 22 may be dimensioned so as to be receivable in the framework 48 of a suspended ceiling assembly 50 as depicted in FIG. 2. Preferably, the side dimensions annotated in FIG. 5 as X and Y may be selected so as to match one or more dimensions of a standard ceiling tile 52. It will of course be appreciated that the X and Y dimensions may also be any size enabling outer frame 22 to be received within the framework 48 of the suspended ceiling assembly 50.

As depicted in FIG. 10, when outer frame 22 is received in framework 48, clamps 38 fit over upwardly extending web 54 of the framework members 56. When in this position, threaded fasteners 46 may be tightened to clamp outer frame 22 in position.

Outer turntable 24 defines aperture 58 for receiving inner turntable 26. Flange 60 extends around perimeter 62, so that when outer turntable 24 is received in aperture 32, flange 60 overlaps upper surface 64 of outer frame 22, and lower surface 66 of outer turntable 24 is generally co-planar with lower surface 68 of outer frame 22. Retainers 70 are attached to upper surface 64 with fasteners 72 at intervals surrounding aperture 32. Each retainer 70 has raised portion 74 extending over upper surface 76 of outer turntable 24 to hold it in place in aperture 32. Bearing buttons 78 have head portion 80 and shank portion 82. Flange 60 defines apertures 84, each for receiving the shank portion 82 of a bearing button 78 so that head portion 80 bears against upper surface 64 of outer frame 22. Bearing buttons 78 may be made from a relatively low friction polymer material, such as for example, HDPE (high density polyethylene) or TEFLON®, so as to enable outer turntable 24 to be rotatably positionable within aperture 32.

Inner turntable 26 defines aperture 85 for receiving column interface flange 28. Flange 86 extends around perimeter 88, so that when inner turntable 26 is received in aperture 58, flange 86 overlaps upper surface 76 of outer turntable 24, and lower surface 90 of inner turntable 26 is generally co-planar with lower surface 66 of outer turntable 24. Again, retainers 70 are attached to upper surface 76 with fasteners 72 at intervals surrounding aperture 58. Each retainer 70 has raised portion 74 extending over upper surface 92 of inner turntable 26 to hold it in place in aperture 58. Flange 86 defines apertures 94, each for receiving the shank portion 82 of a bearing button 78 so that head portion 80 bears against upper surface 76 of outer turntable 24. Again, bearing buttons 78 may be made from a relatively low friction polymer material so as to enable inner turntable 26 to be rotatably positionable within aperture 58.

Knockouts 96 may be defined in inner turntable 26 for receiving electrical boxes (not depicted) on upper surface 92 with the interior of the electrical box facing downward and accessible through the aperture formed by removing the knockout. Column interface flange 28 generally includes plate portion 98 and upwardly extending collar 100. Plate portion 98 defines apertures 102 for receiving fasteners 104, which extend through apertures 106 defined in inner turntable 26 surrounding aperture 85. Column interface flange 28 is received on upper surface 92 with collar 100 aligned with aperture 85. Wingnuts 108 or other similar securing device thread onto fasteners 104 to secure column interface flange 28 in place. The inner surface 110 of collar 100 may be threaded to receive the threaded end 112 of a pipe column 114, which is in turn coupled to a projector or other device to be hung from the ceiling.

Figure 5:
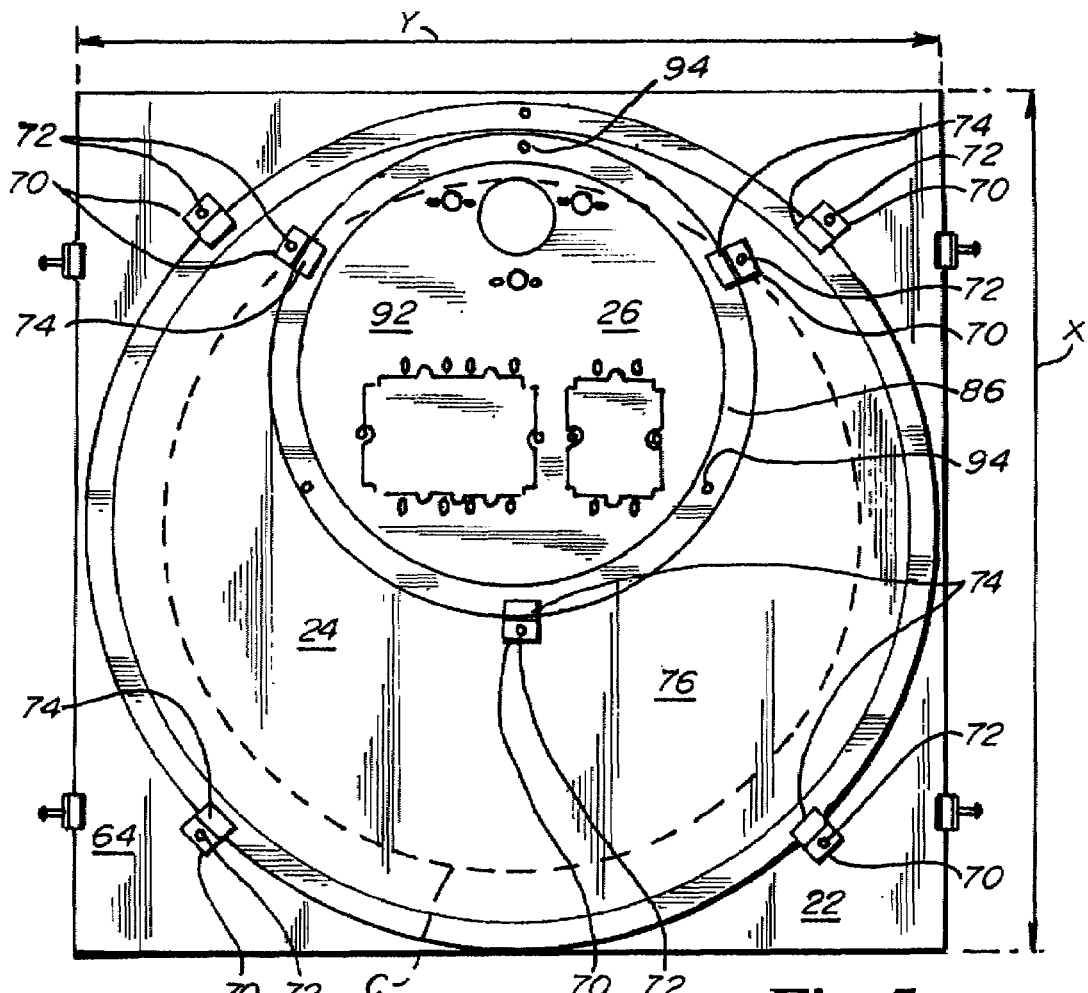
FIG. 5 is a top plan view of a mount interface for suspended ceiling according to an embodiment of the invention.
Figure 6:
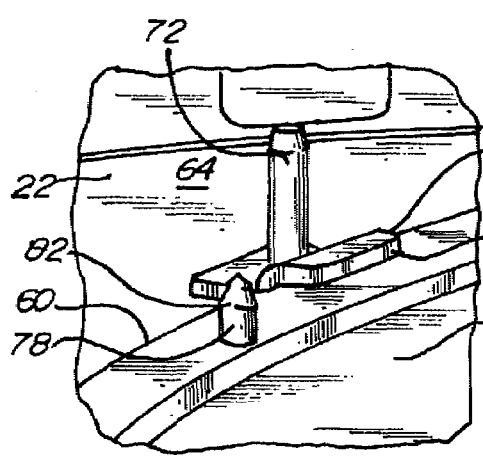
FIG. 6 is a fragmentary perspective view of the region of FIG. 1 denoted with a broken-line circle and annotated FIG. 6.
Figure 7:
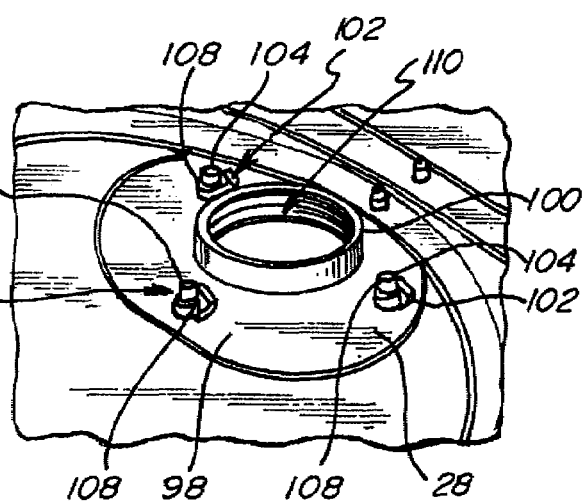
FIG. 7 is a fragmentary perspective view of the region of FIG. 1 denoted with a broken-line circle and annotated FIG. 7.
Figure 14:
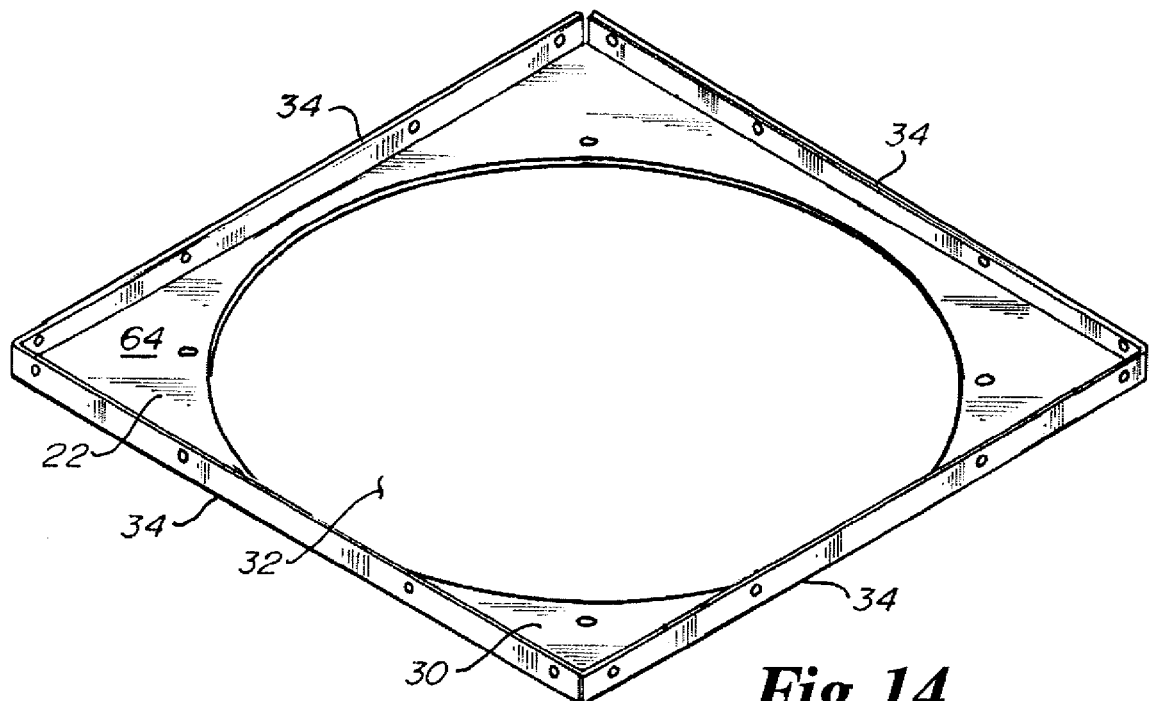
FIG. 14 is a perspective view of the outer frame portion of the mount interface for suspended ceiling depicted in FIG. 5.

In use, with outer frame 22 in position in framework 48, outer turntable 24 and inner turntable 26 may be independently rotated to position column interface flange 28 as desired at virtually any position within the circle C depicted in FIG. 5. The device to be mounted may then be attached to column interface flange 28 via pipe column 114. Power and signal wires for the mounted device may be routed through electrical boxes accessible through knockouts 96. Additionally, outer turntable 24 and inner turntable 26 may be independently rotated with the device attached for fine positioning adjustment. Still further pipe column 114 may be rotated about its longitudinal axis relative to column interface flange 28 or the projector may be rotated relative to the longitudinal axis of pipe column 114 for yaw adjustment of projector positioning.

Figure 15:
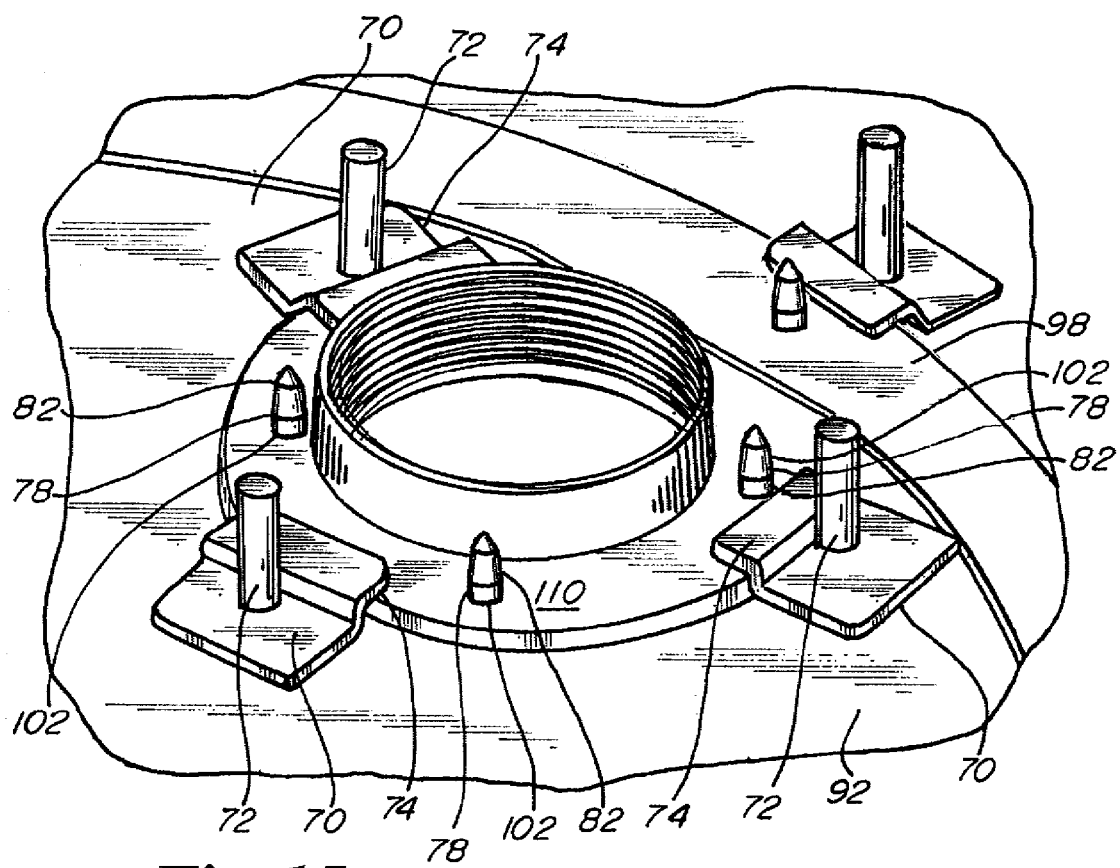
FIG. 15 is a fragmentary perspective view of an alternative embodiment of the invention depicting the column interface flange.

FIG. 15 depicts a portion of an alternative embodiment of the mount interface 20 of the invention wherein the column interface flange 28 is rotatably mounted over aperture 85. Retainers 70 are attached to upper surface 92 with fasteners 72 at intervals surrounding aperture 84. Each retainer 70 has raised portion 74 extending over upper surface 116 of column interface flange 28 to hold it in place over aperture 85. Plate portion 98 defines apertures 102, each for receiving the shank portion 82 of a bearing button 78 so that head portion 80 bears against upper surface 92 of inner turntable 26. Again, bearing buttons 78 may be made from a relatively low friction polymer material so as to enable column interface flange 28 to be rotatably positionable around aperture 84.

Figure 16:
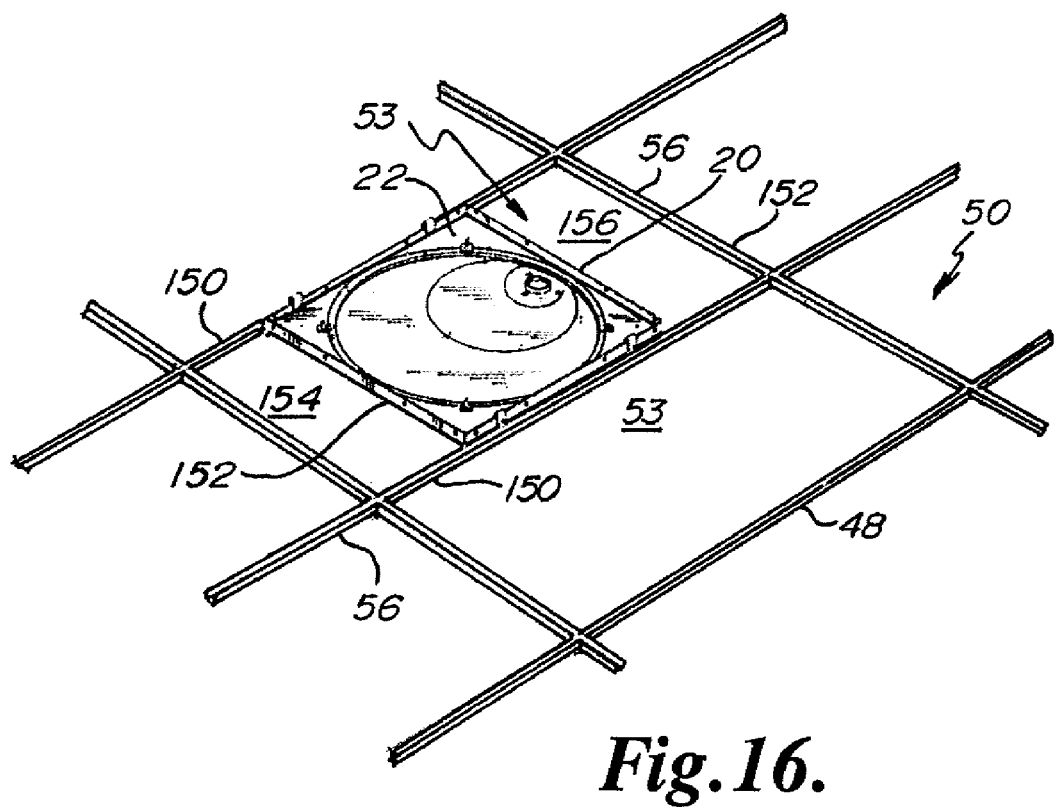
FIG. 16 is a perspective view of a mount interface for suspended ceiling according to an embodiment of the invention in a suspended ceiling framework.
Figure 17:
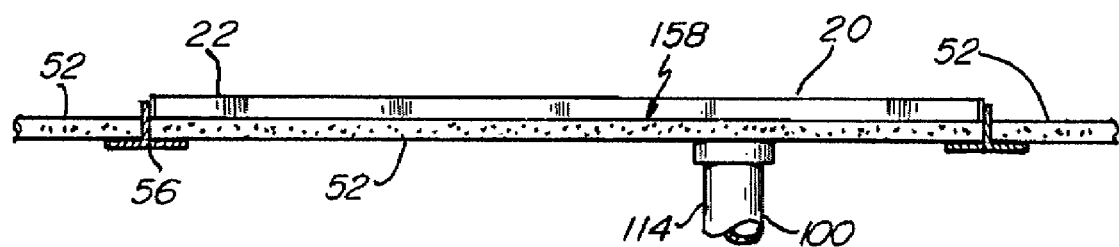
FIG. 17 is a cross-sectional view of a mount interface for suspended ceiling according to an embodiment of the invention installed above the tile in a suspended ceiling.

In another embodiment depicted in FIG. 16, the outer frame 22 is dimensioned smaller in one direction than the framework 48 of a suspended ceiling assembly 50, such that the outer frame 22 may be received within the framework 48 of the suspended ceiling assembly 50, spanning between parallel frame members 150 but not spanning the entire distance between intersecting parallel frame members 152. For instance, framework 48 may be a standard 2 foot by 4 foot grid, while outer frame 22 is 2 foot by 2 foot. Panels 154, 156, may be cut to fit so as to fill in between outer frame 22 and members 152 as needed.

Outer frame 22 is affixed to the framework 48 by way of attachment to members 150 or may be affixed to other support structure located above suspended ceiling assembly 50. For example, when outer frame 22 is received in aperture 53 defined by members 150, 152, clamps 38 can be used to affix outer frame 22 to extending web 54 of members 150, where the web 54 is adjacent wall 34 of frame 22. Alternatively, mounting cables 120 can be used to affix outer frame 22 in position as previously described. Outer frame 22 includes wall 34 which extends upwardly at perimeter 36 of outer frame 22. Further, wall 34 defines apertures 21 for receiving mounting cables 120. The choice of which apertures 21 to use may depend upon the particular configuration and location of framework members 56 or support structure above suspended ceiling assembly 50. Mounting cable 120 is threaded through selected aperture 21 and end of mounting cable 120 is clamped onto itself, forming a loop that extends through aperture 21. Mounting cable 120 may be threaded through more than one aperture prior to forming a loop by clamping end of mounting cable 120 onto itself. The free end of mounting cable 120 may be used to attach the suspended ceiling mount interface to framework members 56 or to other structure located above the suspended ceiling assembly 50. Framework members 56 define apertures 57, and mounting cable 120 may be looped through at least one aperture 57 prior to being clamped to itself. Alternatively, free end of mounting cable 120 may be similarly attached to other structure above suspended ceiling assembly 50.

In another embodiment, the suspended ceiling mount interface 20 is not set into ceiling tile 52 and does not replace ceiling tile 52, but instead is positioned above suspended ceiling assembly 50 with lower surface 68 of outer frame 22, lower surface 66 of outer turntable 24, and lower surface 90 of inner turntable 26 confronting upper surface 158 of ceiling tile 52. As previously described, outer frame 22 may be affixed to the framework 48 by way of the framework members 56 or may be affixed to other support structure located above suspended ceiling assembly 50.

Once suspended ceiling mount 20 has been affixed in place, ceiling tile 52 may be cut so as to enable collar 100 of column interface flange 28 to project therethough and receive pipe column 114. The free end of pipe column 114 is coupled to a projector or other device to be hung from the ceiling. Alternatively, clamps 38 may be used to affix outer frame 22 to extending web 54 of framework members 56 where the web 54 extends sufficiently upward to provide attachment web 54 surface adjacent outer frame wall 34, when the outer frame is positioned above suspended ceiling assembly 50.

It will be appreciated that numerous variations of the ceiling mount disclosed above are possible within the scope of the invention. For instance, although two turntables are included in the embodiments depicted in the figures, other embodiments may have any number of turntables from one to three or more. In addition, although the turntables may be rotatably mounted in apertures as in the embodiments depicted in the figures, it will also be appreciated that one or more of the turntables may be rotatably mounted on the structure with which the turntable is coupled via an axle or other rotatable coupler.

The mount interface of the present invention may be made from any material having suitable strength and durability properties. For instance, the turntables and frame may be made from metal, such as steel or aluminum, polymer, or wood.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to define the scope of the invention.

What is claimed is:

1. A ceiling mount interface for a display device comprising:
   a support structure adapted to be mounted in a ceiling grid of a suspended ceiling;
   a first turntable structure operably coupled with the support structure such that the first turntable is selectively rotatable in relation to the support structure about a first rotational axis, the first turntable defining an aperture;
   a second turntable structure slidably received in the aperture of the first turntable such that the second turntable is selectively rotatable relative to the first turntable and the support structure about a second rotational axis; and
   a structure for receiving a mounting column on the second turntable structure.

2. The ceiling mount interface of claim 1 wherein the support structure comprises a plate defining an aperture, and wherein the first turntable is slidably received in the aperture.

3. The ceiling mount interface of claim 1 wherein the structure for receiving a mounting column comprises a flange defining a pipe nipple extending therefrom.

4. The ceiling mount interface of claim 1 wherein the first rotational axis and the second rotational axis are offset from each other.

5. The ceiling mount interface of claim 1 further comprising a plurality of bearing devices, wherein the first plurality of bearing devices is positioned in an interface between the first turntable structure and the support structure and the second plurality of bearing devices is positioned in an interface between the first turntable structure and the second turntable structure.

6. The ceiling mount interface of claim 5 further comprising a plurality of bearing devices positioned in an interface between the second turntable structure and the structure for receiving a mounting column.

7. The ceiling mount interface of claim 5 wherein the bearing devices are bearing buttons.

8. The ceiling mount interface of claim 1 wherein the mount interface further comprises at least one knock-out panel to accommodate cabling.

9. The ceiling mount interface of claim 1 further comprising a mounting column, wherein the mounting column is selectively rotatable relative to the second turntable and a third rotational axis.

10. The ceiling mount interface of claim 9 wherein the third rotational axis is offset from the first rotational axis and the second rotational axis.

11. A ceiling mount interface for a display device comprising:
    a support structure adapted to be mounted in a ceiling grid of a suspended ceiling, the support structure defining an aperture;
    a first turntable structure disposed in the aperture of the support structure and operably coupled with the support structure such that the first turntable is selectively rotatable in relation to the support structure about a first rotational axis;
    a second turntable structure operably coupled with the first turntable such that the second turntable is selectively rotatable relative to the first turntable and the support structure about a second rotational axis; and
    a mounting column, the second turntable structure including structure for receiving the mounting column, wherein the mounting column is selectively rotatable relative to the second turntable and a third rotational axis.

12. The ceiling mount interface of claim 11 wherein the third rotational axis is offset from the first rotational axis and the second rotational axis.

13. The ceiling mount interface of claim 11 wherein the first rotational axis and the second rotational axis are offset from each other.

14. A mounting system for coupling an electronic display device to a fixed structure, the system comprising:
    a support structure mountable to the fixed structure, the support structure defining an aperture; and
    a rotating assembly disposed in the aperture of the support structure and operably coupled to the support structure, the rotating assembly comprising a first turntable structure and a second turntable structure, wherein the first turntable is selectively rotatable in relation to the support structure about a first rotation axis, and wherein the second turntable structure is selectively rotatable relative to the first turntable and the support structure about a second rotational axis, the rotating assembly further comprising a structure for receiving a mounting column on the second turntable structure such that the mounting column is selectively rotatable relative to the second turntable and a third rotational axis.

15. The mounting system of claim 14 wherein the fixed structure is a suspended ceiling.

16. The mounting system of claim 15 wherein the support structure is adapted to be received in a ceiling grid of the suspended ceiling.

17. The mounting system of claim 15 wherein the support structure is adapted to be received above a ceiling grid of the suspended ceiling.

* * * * *